(12) United States Patent
Chu et al.

(10) Patent No.: US 6,496,707 B1
(45) Date of Patent: Dec. 17, 2002

(54) SYSTEM AND METHOD FOR OPTIMIZING A WIRELESS NETWORK BY ADAPTIVE CONFIGURATION OF BASE STATIONS AND WIRELESS TERMINALS

(75) Inventors: Ta-Shing Chu, Lincroft, NJ (US); Michael J. Gans, Holmdel, NJ (US); Yu Shuan Yeh, Freehold, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/012,512

(22) Filed: Jan. 23, 1998

(51) Int. Cl.[7] .............................. H04Q 7/20; H04B 1/38
(52) U.S. Cl. ...................... 455/525; 455/561; 455/513; 455/552; 455/524; 455/436
(58) Field of Search ................. 455/423, 513, 455/525, 524, 424, 425, 446, 440, 462, 465, 561, 560, 562, 453, 436–439, 62, 67.3, 226.1, 226.2, 422, 507; 370/332, 331, 328, 913, 333, 252, 388; 342/702

(56) References Cited

U.S. PATENT DOCUMENTS

| | | | | |
|---|---|---|---|---|
| 5,175,867 A | * | 12/1992 | Wejke et al. ........... 455/438 X |
| 5,406,615 A | * | 4/1995 | Miller, II et al. ........... 455/552 |
| 5,442,680 A | * | 8/1995 | Schellinger et al. ........ 455/552 |
| 5,533,099 A | * | 7/1996 | Byrne ........................ 455/552 |
| 5,673,307 A | * | 9/1997 | Holland et al. ............. 455/436 |
| 5,697,055 A | | 12/1997 | Gilhousen et al. |
| 5,711,004 A | * | 1/1998 | Blasiak et al. .......... 455/524 X |
| 5,734,979 A | * | 3/1998 | Lu et al. .................. 455/560 X |
| 5,754,139 A | * | 5/1998 | Turcotte et al. ............. 342/373 |
| 5,815,811 A | * | 9/1998 | Pinard et al. ........... 455/525 X |
| 5,923,735 A | * | 7/1999 | Swartz et al. ................ 455/557 |
| 5,933,777 A | * | 8/1999 | Rahmen ................. 455/437 X |
| 6,023,621 A | * | 2/2000 | Jackson et al. ............. 455/552 |
| 6,223,041 B1 | * | 4/2001 | Egner et al. ............ 455/453 X |

FOREIGN PATENT DOCUMENTS

CA 2196903 2/1996

* cited by examiner

Primary Examiner—Tracy Legree
(74) Attorney, Agent, or Firm—Hitt, Gaines Boisbrun

(57) ABSTRACT

For use in a wireless network having geographically-distributed base stations that serve wireless terminals, a system for, and method of, improving an operation of the wireless network. In one embodiment, the system includes: (1) a signal quality determination circuit that determines a relative quality of signals communicated between one of the wireless terminals and a set of base stations within range of the one of the wireless terminals and (2) a base station selection circuit, coupled to the signal quality determination circuit, that selects a base station in the set to serve the one of the wireless terminals based on the relative quality of signals.

25 Claims, 2 Drawing Sheets

SYSTEM AND METHOD FOR OPTIMIZING A WIRELESS NETWORK BY ADAPTIVE CONFIGURATION OF BASE STATIONS AND WIRELESS TERMINALS

TECHNICAL FIELD OF THE INVENTION

The present invention is directed, in general, to wireless communications and, more specifically, to a system and method for optimizing a wireless network by adaptive configuration of base stations and wireless terminals.

BACKGROUND OF THE INVENTION

Recent legislation in telecommunications promote competition among telephone service providers by allowing long distance carriers to enter into the local telephone market to compete with local service providers. The competition provides benefits such as competitive pricing and one-stop shopping for international and domestic long distance and local service. Long distance carriers seeking to enter the local telephone market face severe disadvantages, however, in competing with the entrenched local service providers. One disadvantage results from the local service provider's ownership of a local loop, the wired connection from a local service provider's central office to its customers' telephones at individual homes and businesses. Long distance carriers may either lease the local loop from the local service providers, or they may build their own networks, connecting customers' telephones to the central office. Since the local loops are currently leased at high prices, many long distance carriers seeking to enter the local telephone market have chosen instead to build their own networks.

It has proven uneconomical to build the new networks using wire. Therefore, many long distance carriers have chosen to bypass the local loops entirely with the use of wireless networks (giving rise to the term "wireless bypass networks"). Wireless bypass networks are essentially stationary versions of cellular communications networks, consisting of a network of multiple base stations with fixed antennas, connected to wireless terminals placed in customers' homes and businesses.

Wireless bypass networks thus provide an economically sound solution to the problem of connecting individual customers to the communications network. Wireless bypass networks, however, have some inherent problems.

One problem, commonly found in wireless networks, is poor signal quality. Although users may tolerate low signal quality and dropped connections with respect to their cellular phones, they expect and receive a much higher level of service from the local loops. Service providers wishing to enter the local market must therefore focus on improving signal quality to provide service comparable to that of the local loops.

Another problem, commonly found in cellular networks, is traffic overload. Since the cost of initially installing a large number of base stations is prohibitively high, service providers typically start operations with a small number of base stations, installing additional base stations as traffic increases. With a smaller number of base stations, traffic overload situations are more likely to occur. Cellular systems experience traffic overloads during peak usage hours. When this occurs, many cellular users are unable to place calls on an initial attempt and must redial, sometimes repeatedly, until the base station is able to process the call. Cellular users are typically willing to accept this inconvenience in exchange for mobility. Home and business users, however, are much less tolerant of traffic overloads. A successful wireless bypass network, therefore, must be able to effectively resolve the traffic overload problem.

Accordingly, there is a need in the art for systems and methods that provide optimal and automatic load-sharing among the base stations in a wireless network. More specifically, there is a need in the art for improved systems and methods that allow a wireless network to adapt itself optimally and automatically to a given geographical distribution of base stations and wireless terminals.

SUMMARY OF THE INVENTION

To address the above-discussed deficiencies of the prior art, the present invention provides, for use in a wireless network having geographically-distributed base stations that serve wireless terminals, a system for, and method of, improving an operation of the wireless network. In one embodiment, the system includes: (1) a signal quality determination circuit that determines a relative quality of signals communicated between one of the wireless terminals and a set of base stations within range of the one of the wireless terminals and (2) a base station selection circuit, coupled to the signal quality determination circuit, that selects a base station in the set to serve the one of the wireless terminals based on the relative quality of signals.

The present invention therefore introduces a way to improve the operation of a wireless network by examining at least some of the signals in the network and making base station/wireless terminal pairing decisions based thereon.

In an alternative embodiment of the present invention, the system is contained within the one of the wireless terminals. In this embodiment, the present invention provides a way for a given wireless terminal to select the "best" base station to use.

In an alternative embodiment, the system is associated with each of the base stations. In this embodiment, the base station selection circuit optimizes an assignment of the wireless terminals to the base stations based on the relative quality of signals. This results in an improvement in wireless network operation that is more from the perspective of the network. In a more specific embodiment, the base station selection circuit further optimizes the assignment of the wireless terminals to the base stations based on a loading of the base stations thereby to optimize an overall traffic assignment of the wireless network. In some applications, optimizing solely based on signal quality may result in uneven loading of base stations, harming overall wireless network operations. It may prove valuable, therefore, to consider base station loading in addition to signal quality when making traffic assignment decisions.

In an alternative embodiment of the present invention, the one of the wireless terminals is associated with a fixed location. "Fixed location" is defined as a sedentary venue, such as a house, an apartment, an office suite, or the like (those places served by wireless bypass networks), as opposed to a moving location, such as a vehicle. Of course, those skilled in the art will readily see that the present invention is advantageous in conventional wireless networks wherein wireless terminals readily move about from one base station to another.

In an alternative embodiment of the present invention, the relative quality of the signals is determined with reference to a signal characteristic selected from the group consisting of: (1) signal strength, (2) signal distortion and (3) signal continuity. Those skilled in the art will readily perceive that other measures of signal quality may prove advantageous in certain applications.

In an alternative embodiment of the present invention, the signal quality determination circuit and the base station selection circuit operate continually. This means that traffic assignments in a given network may be made completely dynamic, dependent upon time of day, weather, traffic, addition or removal of base stations or any other network-affecting occurrence.

In an alternative embodiment of the present invention, one of the base stations has a multi-beam antenna associated therewith. In another embodiment of the present invention, one of the wireless terminals has a multi-beam antenna associated therewith. Of course, an electrically or mechanically steerable antenna may also be associated with the base station or the wireless terminal. The directional focusing ability of the multi-beam and steerable antennas allow the use of lower power levels, resulting in a decrease in electromagnetic interference with other sensitive electronic devices.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art appreciate that they can readily use the disclosed conception and specific embodiment as a basis for designing or modifying other structures for carrying out the same purposes of the present invention. Those skilled in the art also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
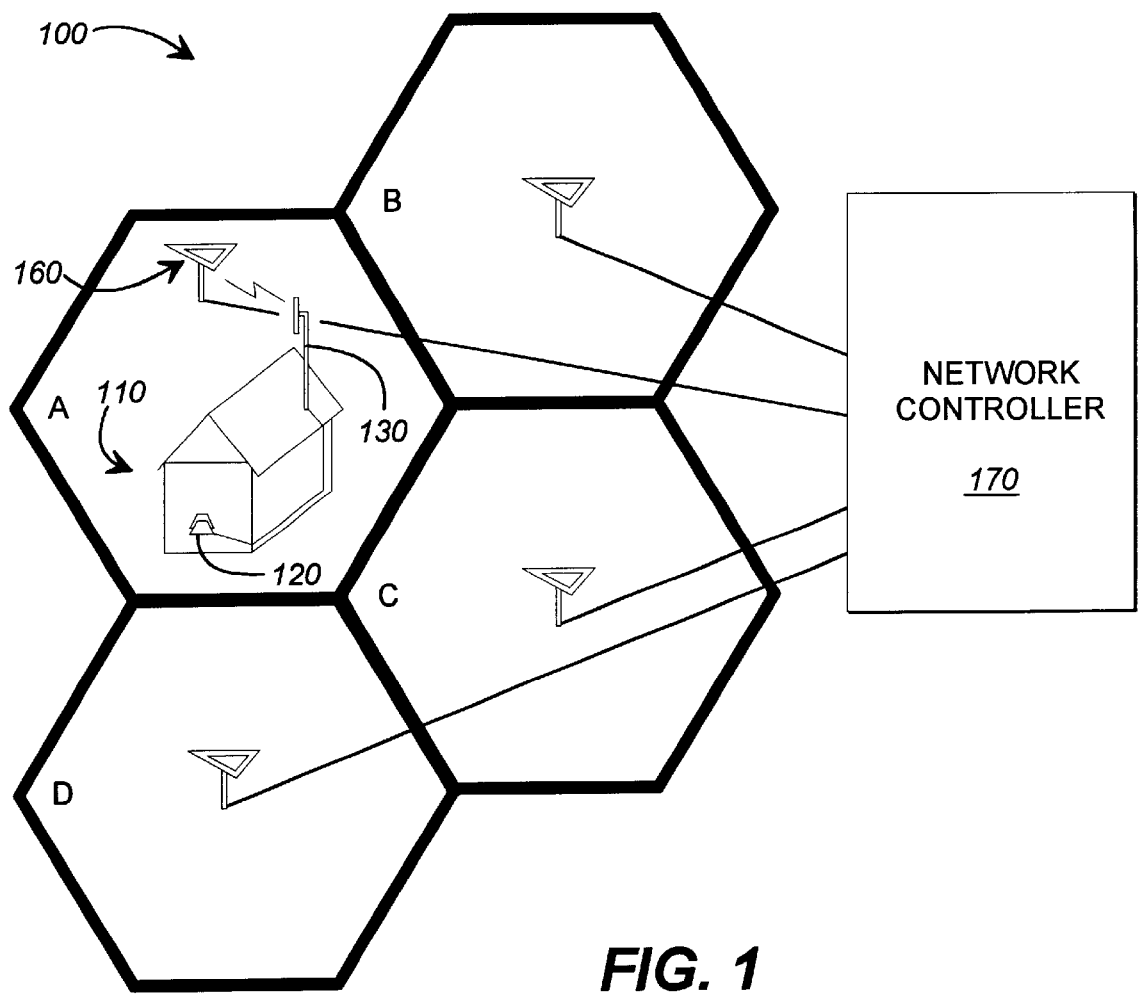
FIG. 1 illustrates a prior art wireless network.

Referring initially to FIG. 1, illustrated is a prior art wireless network 100. The wireless network 100 includes a plurality of wireless terminals (one of which is designated 110) served by geographically distributed base stations (one of which is designated 160). The wireless network 100 further includes a network controller 170 that supervises the operation of the base station 160.

The wireless terminal 110, typically placed in a fixed location, such as a house or office suite, consists of a telephone 120 coupled to an antenna 130. The wireless network 100 is essentially a cellular network wherein the wireless terminals 110 or cellular phones are restricted to a fixed location. Those skilled in the art are familiar with conventional cellular networks and, as a result, the operation thereof will not be described in detail.

One disadvantage of cellular networks is the degradation of signal quality as a cellular terminal moves farther away from a cellular base station. In a stationary application, however, the wireless network 100 may substantially reduce the signal degradation problem by pairing the wireless terminal 110 to the base station 160 that best receives the wireless terminal's 110 signal. By using a fixed pairing scheme, the wireless network 100 may thus maximize signal quality. This pairing scheme, however, is unable to adapt to changing circumstances, such as variations in signal propagation, the installation of new base stations 160, or local overloading of base station 160 traffic. As changes occur, service operations must periodically be performed to reevaluate the pairing scheme, and, if necessary, to assign the wireless terminal 110 to another base station 160.

Figure 2:
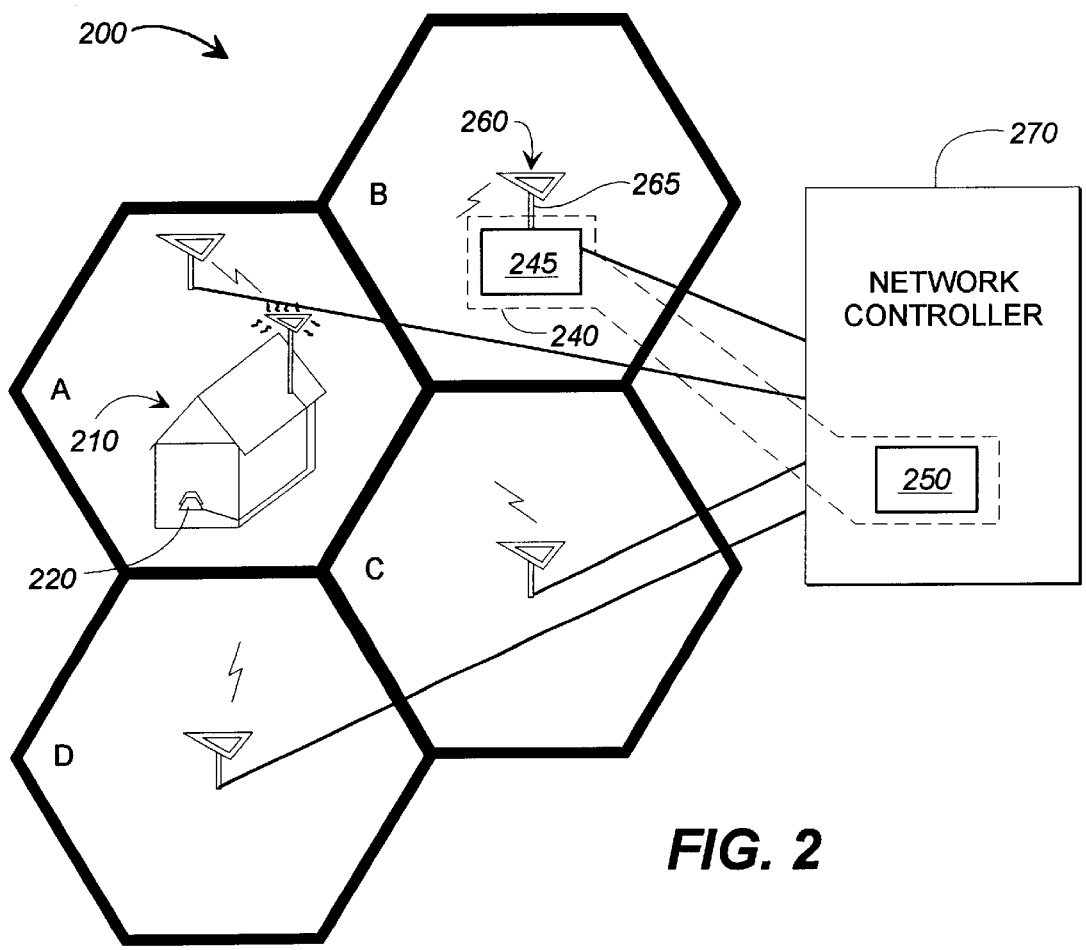
FIG. 2 illustrates a representative wireless network constructed according to the principles of the present invention.

Turning now to FIG. 2, illustrated is a representative wireless network 200 constructed according to the principles of the present invention. The wireless network 200 includes a plurality of wireless terminals (one of which is designated 210), having a telephone 220 and an antenna 230 coupled to the telephone 220. In the illustrated embodiment, the antenna 230 is a multi-beam antenna. In another embodiment of the present invention, the antenna 230 may be an electrically steerable antenna. In yet another embodiment, the antenna 230 may be a mechanically steerable antenna. Of course, the use of non-steerable or omni-directional antennas are also within the broad scope of the present invention. The wireless network 200 further includes geographically distributed base stations (one of which is designated 260) that serve the wireless terminals 210. The wireless network 200 further includes a network controller 270 that supervises the operation of the base stations 260. The wireless network 200 still further includes a system 240 for improving an overall traffic assignment of the wireless network 200. In the illustrated embodiment of the present invention, the wireless network 200 is a cellular network and the wireless terminals 210 are cellular telephones. The telephones 220, may be associated with a fixed location, or alternatively the telephones 220 may be mobile. Of course, the present invention is not limited to cellular networks and cellular telephones, but may be applied to other communications networks as well, such as digital personal communication systems.

The system 240 consists of a signal quality determination circuit 245 coupled to a base station selection circuit 250. In the illustrated embodiment, the signal quality determination circuit 245 is located in the base station, while the base station selection circuit 250 is located in the network controller 270. Of course, the signal quality determination circuit 245 and the base station selection circuit 250 may be located in the same base station 260. Alternatively, the components of the system 240 may be positioned in separate locations. Those skilled in the art will realize that the signal quality determination circuit 245 and the base station selection circuit 250 may be located in the base station 260, the network controller 270, or the wireless terminal 210.

In one embodiment, the signal quality determination circuit 245 may include a sensor for measuring signal characteristics and a microprocessor having a memory that can be programmed to determine the signal quality. Those skilled in the art are familiar with conventional techniques for determining the characteristics of signals. The signal quality determination circuit 245 determines a relative quality of signals communicated between the wireless terminal 210 and a set of base stations 260 within range of the wireless terminal 210. The base station selection circuit 250 selects a base station in the set to serve the wireless terminal 210 based on the relative quality of the signals and a loading of the base stations 260. In one embodiment, the base station selection circuit 250 may include a microprocessor having a memory that can be programmed to determine traffic loading and select the appropriate base station 260. Those skilled in the art are familiar with conventional techniques for determining the loading of a base station 260. In the illustrated embodiment of the present invention, the system 240 is associated with each of the base stations 260. Those skilled in the art realize that the system 240 may, in an alternative embodiment, be contained within each of the wireless terminals 210 or within the network controller 270.

The signal quality determination circuit 245 determines the relative quality of the signals by examining signal strength, signal distortion and signal continuity. The signal quality determination circuit 245 thus allows the wireless network 200 to provide users with higher signal quality and a lower incidence of dropped calls.

The base station selection circuit 250 improves traffic assignment of the wireless network 200 by pairing wireless terminals 210 to base stations 260 based not only on signal quality but also on traffic loading. Traffic assignment based solely on signal quality may result in uneven loading of base stations 260, resulting in traffic overloads during peak usage. By adaptively configuring the traffic assignment, the base station selection circuit 250 may thus select a compromise between signal quality and loading, resulting in better service for the users.

The base station selection circuit 250 may operate continually. Of course the base station selection circuit 250 may be set to operate only periodically, as required. In one embodiment of the present invention, the base station selection circuit 250 dynamically routes each call through the wireless network 200 based on signal quality and loading. In another embodiment of the present invention, the base station selection circuit 250 routes a number of wireless terminals 210 to one base station during peak usage hours, and to another base station during periods of lower usage. Since network usage may shift geographically during a typical business day due to population migration, (e.g., heavier traffic in a metropolitan area during business hours, as compared to heavier traffic in a residential area during non-business hours) the base station selection circuit 250 may be programed to assign and reassign wireless terminals 210 to base stations 260 automatically, based on factors such as time of day and traffic patterns.

Once the base station selection circuit 250 has paired the wireless terminal 210 to the base station 260, the multi-beam antenna 230 associated with the wireless terminal 210 then selects a beam that optimizes the wireless connection to the base station 260. Alternatively, if a steerable antenna is used, the antenna 230 may be steered to a position that provides an optimum connection to the base station. The multi-beam or steerable antenna 230 thus enables the wireless network to adapt to changing circumstances, such as variations in signal propagation (due, for instance, to physical obstructions), the installation of new base stations 260, or local overloading of base station 260 traffic. As changes occur, the wireless terminal 210 may be reconfigured by the system 240 without the need for costly periodic service operations. Further, since a significant portion of the signal may be directed at the appropriate base station 260, lower power levels may be used, thereby resulting in less electromagnetic interference with other sensitive electronic devices.

Figure 3:
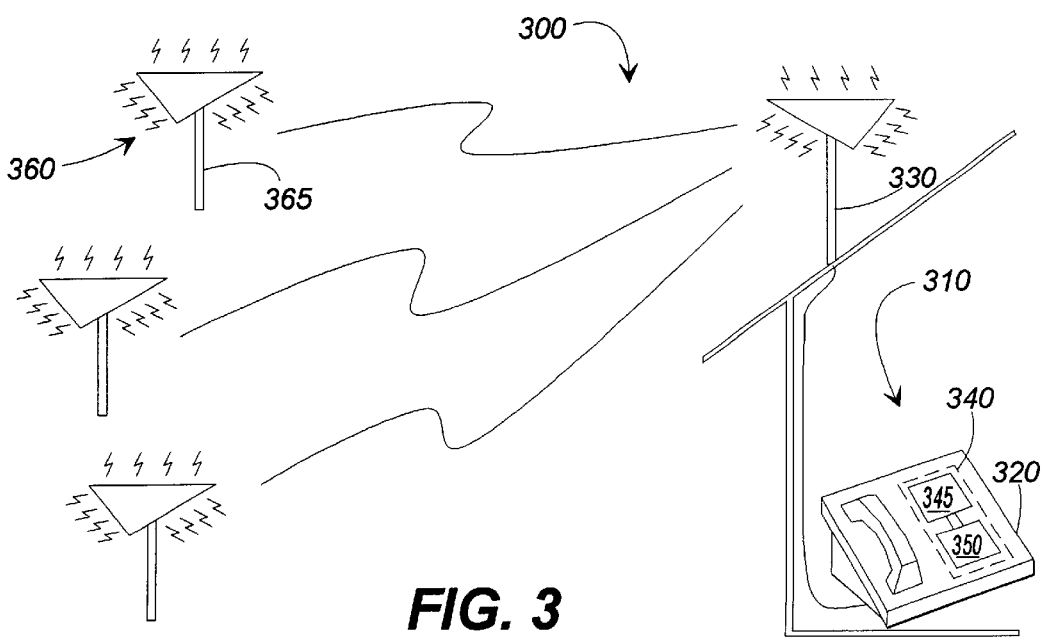
FIG. 3 illustrates another wireless network constructed according to the principles of the present invention.

Turning now to FIG. 3, illustrated is another wireless network 300 constructed according to the principles of the present invention. The wireless network 300 contains a plurality of wireless terminals (one of which is designated 310), having a telephone 320 and an antenna 330 coupled to the telephone 320. The wireless network 300 further includes geographically distributed base stations (one of which is designated 360) that serve the wireless terminals 310.

The wireless terminal 310 contains a system 340 for improving an overall traffic assignment of the wireless network 300 consisting of a signal quality determination circuit 345 coupled to a base station selection circuit 350. Of course, those skilled in the art will realize that the signal quality determination circuit 345 and the base station selection circuit 350 may be located in any part, in separate parts, of the wireless network 300. The signal quality determination circuit 345 and base station selection circuit 350 may be similar to the circuits described above with respect to FIG. 2. In the illustrated embodiment, the system 340 allows the wireless terminal 310 to observe base station 360 transmissions to determine the base station 360 that will provide the highest available signal quality. The wireless terminal 310 may also communicate with the base stations 360 to determine base station 360 loading. The wireless terminal may, therefore, select the most advantageous base station 360 to use, based on factors such as signal quality and traffic loading. The system 340 thereby provides the user with higher signal quality and lower traffic overload problems. Long distance companies seeking to enter the local market may thus use wireless networks 300 (e.g., cellular networks) that incorporate the principles of the present invention to completely bypass the local loop.

Additionally, the antenna 330 coupled to the telephone 320 or the antenna 365 at the base station 360 may be directional multi-beam antennas. The alignment of the beams for the antenna may be automatically redirected to overcome environmental obstructions, or the like, without incurring significant installation costs. The adaptive nature of the antennas 330, 365 enhances the quality of the transmissions by, for instance, adapting to propagation variations to further enhance the quality of the wireless communications.

Although the present invention has been described in detail, those skilled in the art understand that they can make various changes, substitutions and alterations herein without departing from the spirit and scope of the invention in its broadest form.

What is claimed is:

1. For use in a wireless voice communications network having geographically-distributed base stations that serve wireless terminals located at a fixed location, a system for improving an operation of said wireless voice communications network, comprising:

a signal quality determination circuit that determines a relative quality of signals communicated between one of said wireless terminals associated with said fixed location and a set of base stations within range of said one of said wireless terminals; and a base station selection circuit, coupled to said signal quality determination circuit, that selects a base station in said set of base stations to serve said one of said wireless terminals based jointly upon a compromise between said relative quality of signals and a traffic loading of said set of base stations to distribute said traffic loading across said set of base stations, ones of said set of base stations located external of said fixed location, said system being contained within said one of said wireless terminals.

2. The system as recited in claim 1 wherein said relative quality of said signals is determined with reference to a signal characteristic selected from the group consisting of:

signal strength, signal distortion, and signal continuity.

3. The system as recited in claim 1 wherein said system is associated with each of said base stations, said base station selection circuit optimizing an assignment of said wireless terminals to said base stations based jointly upon a compromise between said relative quality of signals and a traffic loading of said set of base stations to distribute said traffic loading across said set of base stations.

4. The system as recited in claim 3 wherein said optimizing further includes optimizing said assignment of said wireless terminals to said base stations based upon time of day, weather, addition of said base stations or removal of said base stations thereby to optimize an overall traffic assignment of said wireless voice communications network.

5. The system as recited in claim 1 wherein said signal quality determination circuit and said base station selection circuit operate continually.

6. The system as recited in claim 1 wherein said base stations have a multi-beam antenna associated therewith.

7. The system as recited in claim 1 wherein said wireless terminals have a multi-beam antenna associated therewith.

8. The system as recited in claim 1 wherein said wireless terminals have an electrically or mechanically steerable antenna associated therewith.

9. For use in a wireless voice communications network having geographically-distributed base stations that serve wireless terminals located at a fixed location, a method of improving an operation of said wireless voice communications network, comprising:

determining a relative quality of signals communicated between one of said wireless terminals associated with said fixed location and a set of base stations within range of said one of said wireless terminals; and selecting a base station in said set of base stations to serve said one of said wireless terminals based jointly upon a compromise between said relative quality of signals and a traffic loading of said set of base stations to distribute said traffic loading across said set of base stations, ones of said base stations located external of said fixed location, said determining and said selecting being carried out in said one of said wireless terminals.

10. The method as recited in claim 9 wherein said determining comprises determining said relative quality of said signals with reference to a signal characteristic selected from the group consisting of:

signal strength, signal distortion, and signal continuity.

11. The method as recited in claim 9 wherein said method is performed in each of said base stations, said method further comprising optimizing an assignment of said wireless terminals to said base stations based jointly upon a compromise between said relative quality of signals and a traffic loading of said set of base stations to distribute said traffic loading across said set of base stations.

12. The method as recited in claim 11 wherein said optimizing further includes optimizing said assignment of said wireless terminals to said base stations based upon time of day, weather, addition of said base stations or removal of said base stations thereby to optimize an overall traffic assignment of said wireless voice communications network.

13. The method as recited in claim 9 further comprising continually repeating said determining and selecting.

14. The method as recited in claim 9 wherein said base stations have a multi-beam antenna associated therewith.

15. The method as recited in claim 9 wherein said wireless terminals have a multi-beam antenna associated therewith.

16. The method as recited in claim 9 wherein said wireless terminals have an electrically or mechanically steerable antenna associated therewith.

17. A wireless voice communications network, comprising:

a plurality of wireless terminals, each of said plurality of wireless terminals associated with a fixed location;

geographically-distributed base stations of a wireless bypass network that serve said plurality of wireless terminals; and a system for improving an overall traffic assignment of said wireless voice communications network, including:

a signal quality determination circuit that determines a relative quality of signals communicated between each of said base stations and a set of said plurality of wireless terminals within range of said each of said base stations, and a base station selection circuit, coupled to said signal quality determination circuit, that optimizes an assignment of said plurality of wireless terminals to said base stations based jointly upon a compromise between said relative quality of signals and a traffic loading of said base stations to distribute said traffic loading across said base stations thereby to improve said overall traffic assignment, ones of said base stations located external of said fixed location, said system being contained within said one of said wireless terminals.

18. The wireless voice communications network as recited in claim 17 wherein said relative quality of said signals is determined with reference to a signal characteristic selected from the group consisting of:

signal strength, signal distortion, and signal continuity.

19. The wireless voice communications network as recited in claim 17 wherein said signal quality determination circuit and said base station selection circuit operate continually.

20. The wireless voice communications network as recited in claim 17 wherein said wireless voice communications network is a cellular network.

21. The wireless voice communications network as recited in claim 17 wherein said plurality of wireless terminals are cellular telephones.

22. The wireless voice communications network as recited in claim 17 wherein said base stations have a multi-beam antenna associated therewith.

23. The wireless voice communications network as recited in claim 17 wherein said wireless terminals have a multi-beam antenna associated therewith.

24. The wireless voice communications network as recited in claim 17 wherein said wireless terminals have an electrically or mechanically steerable antenna associated therewith.

25. The wireless voice communications network as recited in claim 17 wherein said base station selection circuit further optimizes said assignment of said wireless terminals to said base stations based upon time of day, weather, addition of said base stations or removal of said base stations thereby to optimize an overall traffic assignment of said wireless voice communications network.

* * * * *